July 8, 1958
S. H. RICHARDSON
2,841,874
TIRE GAUGE
Filed May 6, 1957
2 Sheets-Sheet 1
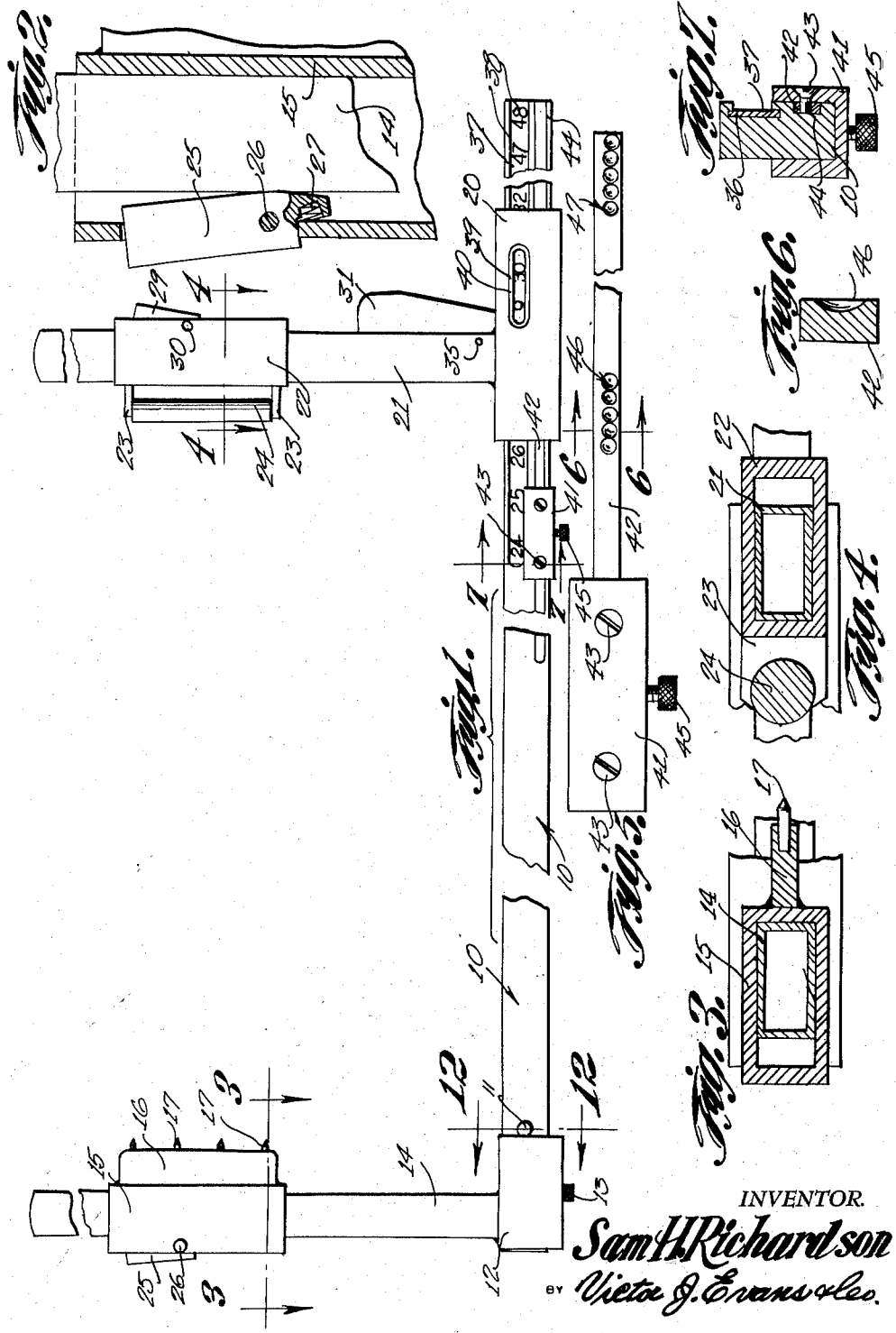
INVENTOR.
Sam H. Richardson
BY Victor J. Evans & Co.
ATTORNEYS July 8, 1958
S. H. RICHARDSON
2,841,874
TIRE GAUGE
Filed May 6, 1957
2 Sheets-Sheet 2
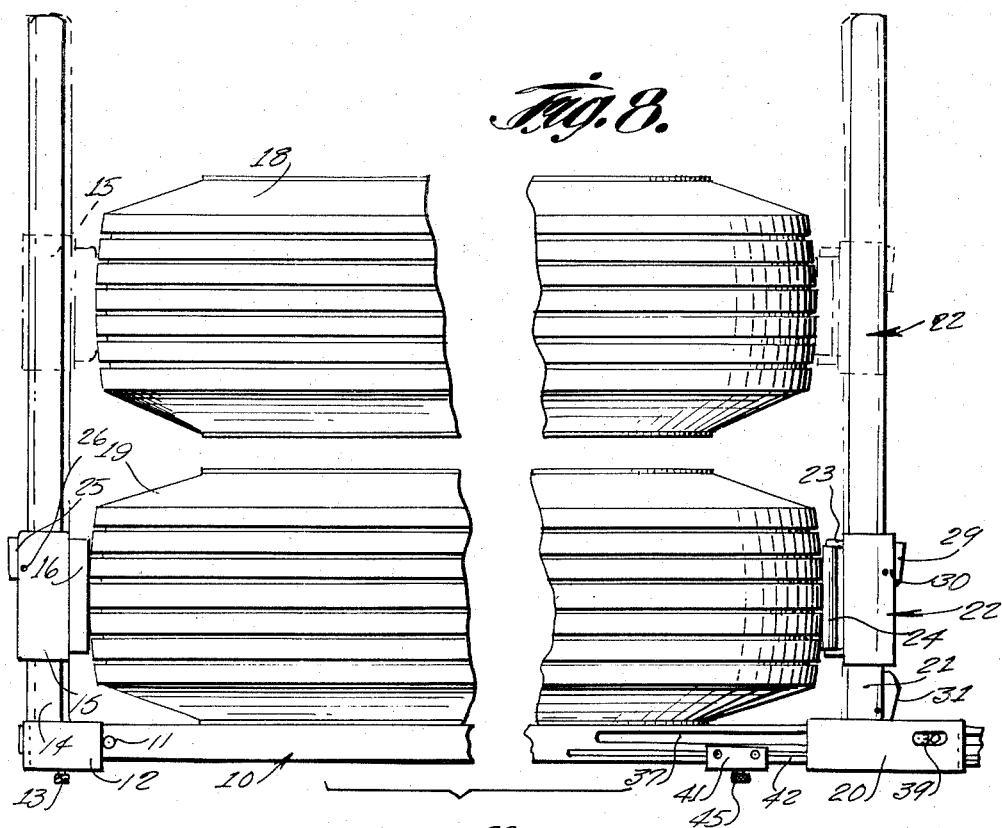
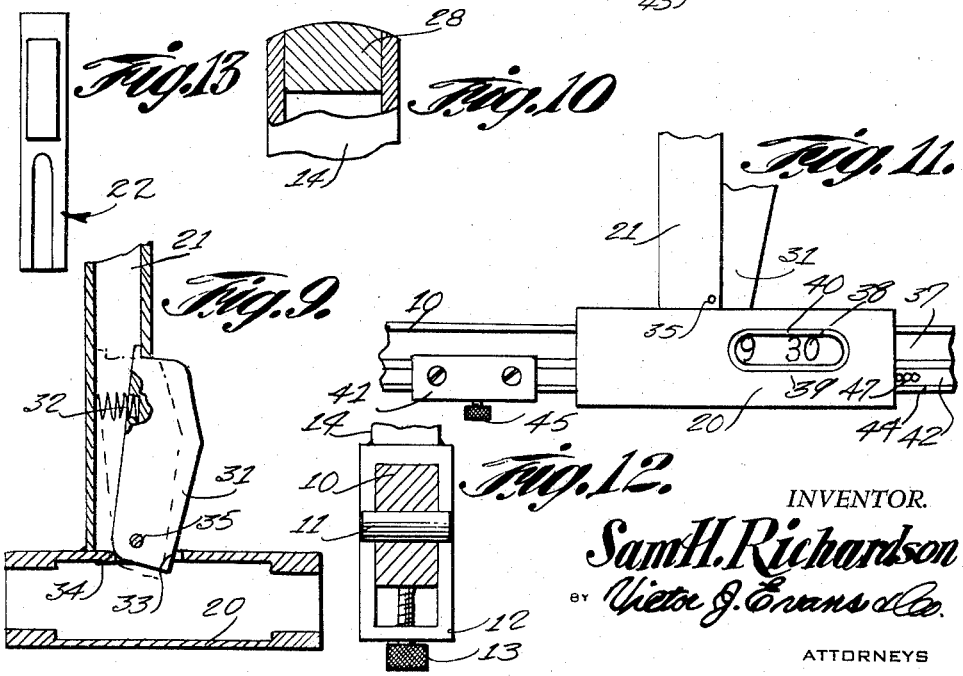
INVENTOR.
Sam H. Richardson
BY Victor J. Evans & Co.
ATTORNEYS

United States Patent Office 2,841,874
Patented July 8, 1958

2,841,874

TIRE GAUGE

Sam H. Richardson, Modesto, Calif.

Application May 6, 1957, Serial No. 657,381

2 Claims. (Cl. 33—143)

This invention relates to a gauge or measuring device, and more particularly to a gauge for measuring and matching tires.

The object of the invention is to provide a gauge which will permit tires to be easily and accurately measured and gauged.

Another object of the invention is to provide a tire gauge which will permit a person to accurately ascertain the diameter and thickness of a tire such as a vehicle tire so that a person can readily determine when to change or rotate the tires of the vehicle.

Another object of the invention is to provide a gauge which is adapted to be used for accurately measuring the outside diameter of tires that are to be run together as duals so that a determination can be made as to whether the tires are near enough to the same size to be mated with each other or with other tires.

A further object of the invention is to provide a tire gauge which is extremely simple and inexpensive to manufacture.

Other objects and advantages will be apparent during the course of the following description.

In the accompanying drawings, forming a part of this application, and in which like numerals are used to designate like parts throughout the same;

Figure 1 is an elevational view illustrating the tire gauge of the present invention.

Figure 2 is a fragmentary sectional view showing a portion of one of the gauge slides.

Figure 3 is a sectional view taken on the line 3—3 of Figure 1.

Figure 4 is a sectional view taken on the line 4—4 of Figure 1.

Figure 5 is an elevational view showing the variation indicator.

Figure 6 is a sectional view taken on the line 6—6 of Figure 5.

Figure 7 is a sectional view taken on the line 7—7 of Figure 1.

Figure 8 is an elevational view illustrating the tire gauge of the present invention being used on dual tires.

Figure 9 is a fragmentary sectional view showing a bracket and its locking mechanism.

Figure 10 is a fragmentary elevational view illustrating a plug in an end of one of the arms.

Figure 11 is a fragmentary sectional view showing the indicating or measuring portion of the device.

Figure 12 is a sectional view taken on the line 12—12 of Figure 1.

Figure 13 is an end elevational view of one of the gauge slides.

Referring in detail to the drawings, there is shown a tire gauge which includes a scale bar 10 that has a stop pin 11 extending transversely therethrough, Figure 12. Mounted on an end of the bar 10 and abutting the pin 11 is a first bracket 12, and extending from the bracket 12 and secured thereto in any suitable manner, as for example by welding is a first arm 14. A suitable securing element such as a set screw 13 extends through the bracket 12 and into engagement with the bar 10 for maintaining the bracket 12 immobile in its adjusted position on the bar 10.

Adjustably mounted on the first arm 14 is a first gauge slide 15, and extending outwardly from the slide 15 and secured thereto or formed integral therewith is a shoulder 16 which carries a plurality of prongs or pins 17 that are adapted to engage tires such as the tires 18 and 19, Figure 8.

Also adjustably mounted on the bar 10 is a second bracket which is indicated generally by the numeral 20, Figure 1, and extending from the bracket 20 and secured thereto is a second arm 21 which has a gauge slide 22 adjustably mounted thereon. A pair of spaced apart ears 23 extend from the gauge slide 22, and the ears 23 carry a roller 24 that is adapted to engage the opposite portion of the tire from the prongs 17.

A locking means is provided for maintaining the gauge slide 15 immobile in its various adjusted positions on the arm 14, and this locking means comprises a locking element 25 which is pivotally connected to the slide 15 through the medium of a pivot pin 26. A coil spring 27 is arranged in engagement with a portion of the element 25 as shown in Figure 2 so that normally the coil spring 27 will cause sufficient pressure to be exerted on the arm 14 whereby accidental shifting of the slide 15 will be prevented. However, when the slide 15 is to be adjusted or moved on the arm 14, it is only necessary to manually move the element 25 so as to compress the coil spring 27 whereby the slide 15 can be moved to the desired location and when pressure is released on the member 25, the slide 15 will be locked in place. The parts such as the arms 14 can be made of hollow metal, and as shown in Figure 10, a closure plug 28 may be positioned in an end of an arm such as the arm 14.

A locking means is provided for maintaining the slide 22 immobile in its various adjusted position on the arm 21, and this locking means functions in the same manner and has substantially the same construction as the locking member 25. However, as shown in Figure 1 for example, the locking mechanism for the slide 22 includes the element 29 which is pivotally connected to the slide 22 by means of the pin 30.

There is further provided a locking mechanism for maintaining the bracket 20 immobile in its various adjusted positions on the bar 10, and this locking mechanism is shown in detail in Figure 9 and includes a locking member or keeper 31 which is pivotally supported by means of a pin 35, and a coil spring 32 engages a portion of the locking member 31. The member 31 further includes a finger 33 which projects through a slot 34 in the bracket 20, and the finger 33 is adapted to engage the bar 10.

The bar 10 is provided with a groove 36, Figure 7, and seated in the groove 36 is a ruler 37 which has graduations 38 thereon. The bracket 20 is provided with an opening 39 that defines a window whereby the graduations 38 can be readily observed therethrough, and an indicator point or marker 40 is arranged contiguous to the window opening 39, Figure 1.

There is further provided a U-shaped support member or clamp 41 which is adjustably mounted on the bar 10, and the support member 41 is secured to an elongated strip 42 through the medium of securing element 43, the strip 42 being seated in a slot 44 in the bar 10. A suitable securing element such as a set screw 45 is provided for maintaining the support member 41 immobile in its adjusted positions on the bar 10. The strip 42 is provided with a pair of spaced apart groups of indentations or dots 46 and 47 which are adapted to be selectively exposed or covered up by the bracket 20, as later described in this application.

From the foregoing, it is apparent that there has been provided a tire gauge which can be used for measuring or gauging tires such as the tires 18 and 19 as shown in Figure 8. The tires 18 and 19 may constitute dual tires or wheels on a vehicle such as a truck or trailer and by means of the gauge of the present invention, a person can readily determine whether the tires match each other, or whether the tires should be mated with other tires. The stop pin 11 is abutted by the brackets 12 so that the bracket 12 will be arranged in its proper position on the bar 10, and the set screw or bolt 13 serves to maintain the bracket 12 connected to the end of the bar 10. The arm 14 is secured to the bracket 12, so that as the bracket 12 is moved, the arm 14 will move therewith. The prongs 17 extend from the shoulder 16 on the gauge slide 15, and as previously described, the gauge slide 15 can be adjusted or moved along the arm 14 whereby the prongs 17 can be arranged in engagement with either the tire 19 or the tire 18, as shown by solid and dotted lines in Figure 8. The locking member 25 maintains the slide 15 immobile in its adjusted position but by manually depressing the locking member 25, the slide 15 can be moved to a new position.

The support member 41 can be adjusted on the bar 10 by unloosening the set screw 45, and the graduations 38 on the ruler 37 are observed through the window opening 39 in the bracket 20. By manually moving the locking member 31, the bracket 20 can be moved in different adjusted positions on the bar 10, and as previously described the arm 21 is secured to the bracket 20. The slide 22 can be moved or adjusted along the arm 21 so that the roller 24 can be arranged in engagement with either of the tires 18 and 19 as shown in Figure 8. The graduations 38 which appear through the window opening 39 can be calibrated so as to provide a reading for the diameter of the tires. The dots or indentations 46 and 47 serve as a means for indicating whether the tires 18 and 19 are of the same size or different size so that a person can readily determine whether or not these tires match or should be mated with other tires.

The gauge of the present invention is adapted to be used as follows: Initially both gauge slides 15 and 22 are adjusted on their arms to contact the center of the off side tire 19, Figure 8, and the gauge is placed squarely against the side of the tire across the diameter. With the slide 15 against the tread of the tire 19, the other arm 21 is moved towards the arm 14 until the roller 24 and slide 22 touches the tread of the tire 19. Next, the set screw 45 is loosened, and the variation indicator member 41 is adjusted on the bar 10 so that none of the dots 46 and 47 show from beneath the bracket 20, and then the thumb screw 45 is tightened and the outside diameter of the tire 19 may be observed through the window 39 and recorded if desired.

To compare the inside tire 18 to the outside tire 19, it is only necessary to readjust the gauge slides 15 and 22 so that they contact the center of the inside tire 18 on the tread portion thereof. Thus, with the prongs 17 engaging the tread of the tire 18, the lock 31 can be released so as to permit the arm 21 to be moved towards or away from the arm 14 until the roller 24 touches the tread of the tire 18. During this step the variation indicator 41 and strip 42 remain fixed to bar 10 by thumb screw 45; thus the variation of diameter between the tire 18 and the tire 19 is shown by the number of dots 46 or 47 which are exposed on the strip 42, and these dots may be arranged so that each dot or indentation represent ⅛ of an inch displacement from the original position of bracket 20 over strip 42. With the arm 21 locked in position, the gauge may be removed from the tire without disturbing the diameter readings or the variation readings.

The slide 15 may constitute a left hand slide, while the slide 22 can constitute a right hand slide. In Figure 8, the slide in the solid line position as shown being used for checking an outside tire, while the dotted line position of Figure 8 shows the slides in position for checking an inside tire. As shown in Figure 11, with the three dots 47 exposed or showing, this serves to indicate that the inside tire 18 is ⅜ of an inch smaller in diameter than the outside tire 19. When the dots 46 show instead of the dots 47, then there is indication that the outside tire 19 is smaller than the inside tire 18.

Thus it will be seen that there has been provided a dual tire gauge which will accurately measure the outside diameter of tires that are to be run together as duals and whereby a determination can be made if such tires are near enough the same size to be mates or mated with other tires. With regular matching maintenance, tires can be properly rotated to give the utmost performance in treadwear and equipment efficiency, so that equipment owners can correct and control any mismatched dual tire condition which continually arises due to several factors such as road conditions, carcass trouble, one tire wearing faster than its mate, and misalignment.

The gauge can be used to measure any tire whether it is on or off the equipment, and the variation indicator gauge including the elements 41 and 42 will tell if the tires are near enough the same diameter to run together as duals. If the tires are within ⅛ inch or less, only part or all of the first dots which may be painted green, will show. If more than ⅛ inch and not more than ¼ of an inch difference exists, the next dot 46 or 47 on the gauge will indicate yellow which means that this is the maximum difference in tolerance allowed. If more than ¼ of an inch off, the dots 46 and 47 may be colored red and when such red dots show, there will be an indication that the tires should be matched with other tires of the same size if possible.

In order to insure best results in tire and equipment performance, all dual tires are preferably kept within the green range as indicated on the variance indicator gauge.

Furthermore, tire users will be able to send their tires in for recapping and better matched condition and after the tires have been recapped, by use of the gauge, tires of the same size can be provided whereby there will result in better matching tires and better tire performance.

By means of the present invention, tires can be measured and matched accurately and easily without guess work. For example, truck owners or other persons will be able to keep tires properly matched whereby the tread mileage will be increased. Also, on dual drive trucks, truckers will be able to keep eight tires in the same size running together so that truck rear end heating and repairing will be reduced and tire mileage will be increased so that it will be seen that the gauge will increase tire efficiency.

The gauge can also be used to measure tires while the tires are mounted on the truck or else the tires can be measured when they are dismounted. In view of the fact that mismatched tires are the cause of many blow-out, fast treadwear and unnecessary truck rear end repairs, it will be seen that the gauge of the present invention will prove advantageous with such situations and the gauge will permit the user to gain more mileage out of the tires as well as the truck rear end parts. For example, dual tires do not wear the same amount as a general rule unless they are properly rotated and switched from the inside position to the outside position and kept properly matched with one another but with the present invention it is easy to check on the tires.

As a general rule, if the tires are more than ¼ of an inch difference in diameter, the tire should be changed and matched with other tires of the same size. The gauge can be made of any suitable material such as light weight metal which is sufficiently strong. Furthermore, the gauge can be used to tell how much the larger truck tire is overloaded by checking the diameter of the dual tires when a truck or other vehicle is fully loaded. The graduation 30 appearing through the window 39 provides an indication for measuring the diameter of the tire. The various scale markings may be properly calibrated so as to permit the readings to be made with facility and speed. The ruler 37 may be in the form of a flexible steel tape. The various movable parts are provided with spring pressed locks so as to prevent accidental shifting thereof.

The above description of the invention is for illustrative purposes only and it is understood that modifications may be made in the construction within the scope and spirit of the following claims.

I claim:

1. In a tire measuring device, a bar, a limit pin extending transversely through said bar, a first bracket mounted on an end of said bar and abutting said pin, a securing element extending through said bracket and engaging said bar, a first arm extending from said first bracket and secured thereto, a first gauge slide adjustably mounted on said arm, a shoulder extending from said slide and secured thereto, a plurality of spaced apart pointed prongs carried by said shoulder, a manually operable spring pressed locking member carried by said slide for engagement with said arm to maintain said slide immobile in its adjusted position, a second bracket adjustably mounted on said bar, a second arm extending outwardly from said second bracket and secured thereto, a manually operable spring pressed locking member carried by said second arm and said second bracket for engagement with said bar to maintain said second bracket immobile in its adjusted position, a second gauge slide adjustably mounted on said second arm, a manually operably locking member carried by said second gauge slide for maintaining said second gauge slide immobile in its adjusted positions, a pair of spaced parallel ears extending from said second gauge slide and secured thereto, a roller extending between said ears and connected thereto, there being a groove in said bar, a ruler positioned in said groove and having graduations thereon, there being an opening in said second bracket defining a window for permitting observation of said graduations.

2. In a tire measuring device, a bar, a limit pin extending transversely through said bar, a first bracket mounted on an end of said bar and abutting said pin, a securing element extending through said bracket and engaging said bar, a first arm extending from said first bracket and secured thereto, a first gauge slide adjustably mounted on said arm, a shoulder extending from said slide and secured thereto, a plurality of spaced apart pointed prongs carried by said shoulder, a manually operable spring pressed locking member carried by said slide for engagement with said arm to maintain said slide immobile in its adjusted position, a second bracket adjustably mounted on said bar, a second arm extending outwardly from said second bracket and secured thereto, a manually operable spring pressed locking member carried by said second arm and said second bracket for engagement with said bar to maintain said second bracket immobile in its adjusted position, a second gauge slide adjustably mounted on said second arm, a manually operable locking member carried by said second gauge slide for maintaining said second gauge slide immobile in its adjusted positions, a pair of spaced parallel ears extending from said second gauge slide and secured thereto, a roller extending between said ears and connected thereto, there being a groove in said bar, a ruler positioned in said groove and having graduations thereon, there being an opening in said second bracket defining a window for permitting observation of said graduations, said bar being provided with a slot therein, an elongated strip seated in said slot and provided with spaced apart first and second sets of indicating marks adapted to be selectively covered and exposed by said second bracket, a support member adjustably mounted on said bar and connected to an end of said strip, and a securing element extending through said support member for engagement with said bar.

References Cited in the file of this patent
UNITED STATES PATENTS

| | | |
|---|---|---|
| 474,111 | Bauer | May 3, 1892 |
| 571,094 | McIntyre | Nov. 10, 1896 |
| 1,510,285 | Lustenberger | Sept. 30, 1924 |
| 2,030,354 | Czemba | Feb. 11, 1936 |
| 2,192,399 | Downes | Mar. 5, 1940 |
| 2,566,407 | Evans | Sept. 4, 1951 |
| 2,566,435 | Trimmer | Sept. 4, 1951 |
| 2,645,022 | Hart | July 14, 1953 |

FOREIGN PATENTS

| | | |
|---|---|---|
| 257,147 | Switzerland | Mar. 16, 1949 |
| 382,544 | France | Dec. 11, 1907 |